(No Model.)

L. BARNES, Sr. & C. O. BARNES.
PNEUMATIC TIRE.

No. 535,189. Patented Mar. 5, 1895.

WITNESSES:
J. J. Laass
C. L. Bendix

INVENTORS:
Lucien Barnes Sr.
and Charles O. Barnes
By E. Laass
their ATTORNEY

UNITED STATES PATENT OFFICE.

LUCIEN BARNES, SR., AND CHARLES O. BARNES, OF SYRACUSE, NEW YORK.

PNEUMATIC TIRE.

SPECIFICATION forming part of Letters Patent No. 535,189, dated March 5, 1895.

Application filed June 29, 1894. Serial No. 516,037. (No model.)

*To all whom it may concern:*

Be it known that we, LUCIEN BARNES, Sr., and CHARLES O. BARNES, of Syracuse, in the county of Onondaga, in the State of New York, have invented new and useful Improvements in Bicycle-Tires, of which the following, taken in connection with the accompanying drawings, is a full, clear, and exact description.

This invention relates to the attachment of pneumatic tires or the jacket or cover thereof to the rim of a wheel; and it consists in forming the said jacket with an annular circumferential fold in each edge thereof engaging the edges of the rim, and a pair of endless rings or hoops located on the outer face of the rim and separable from said rim and jacket to hold said jacket thereon as hereinafter more fully described and set forth in the claims.

Figure 1:
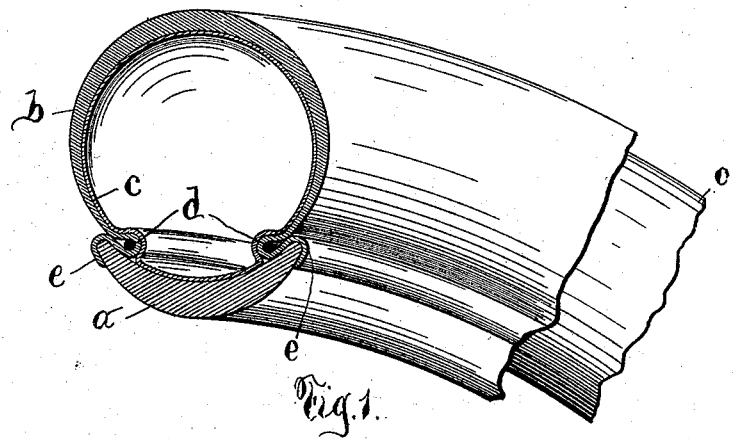
Figure 2:
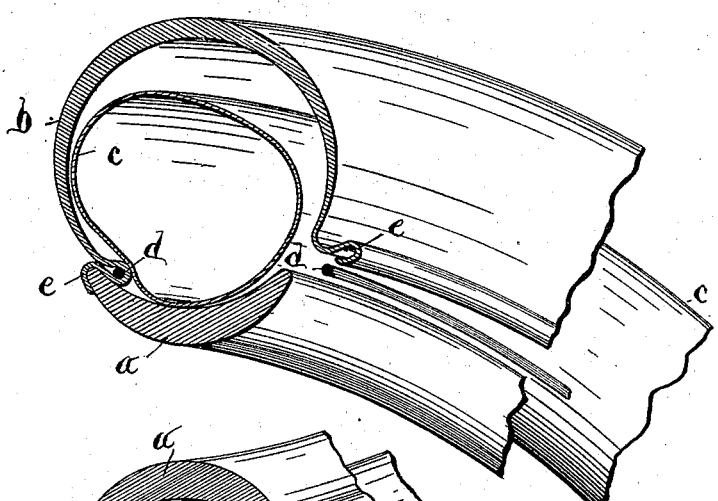
Figure 3:
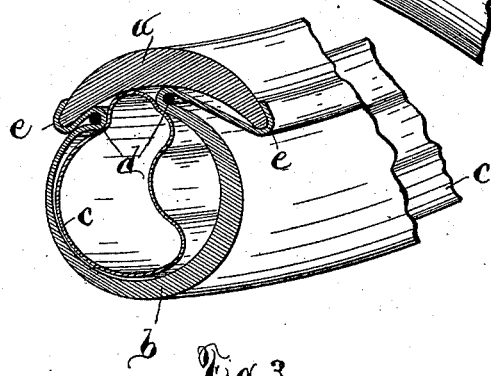

In the annexed drawings, Figure 1 is a cross sectional view showing my improved tire attachment. Fig. 2 is a similar view showing the jacket of the tire partly detached, and Fig. 3 is also a cross sectional view showing the first step in detaching the jacket from the rim.

Similar letters of reference indicate corresponding parts.

—a— represents the rim of the wheel which is preferably crescent shaped, and —b— denotes the jacket of the tire which is formed with an annular circumferential fold —e— in each of its edges, which folds are preferably stiffened and engage the edges of the rim. On the outer face of the rim is located a pair of non-extensible rings or hoops —d—d— separable from the rim and jacket between which rings or hoops and the rim is held the said jacket.

By inflating the air-tube —c—, the jacket draws from under the rings toward the center of the rim and thereby forces the rings toward the edges of the rim and said rings being of smaller diameter than the edges of the rim, the jacket —b— is pinched thereat between the rings and said edges as plainly shown in Fig. 1 of the drawings.

The jacket is removed in the following manner: After deflating the air-tube, one of the rings —d— is brought to the center of the rim and being of larger diameter than the center, one portion of the ring is held against the center which consequently throws the diametrically opposite portion a sufficient distance from the rim so that the jacket may be drawn from beneath the ring, after disengaging the folds from the edges of the rim and thus the jacket is detached. The jacket is replaced in the same manner.

What we claim is—

1. In a pneumatic tired wheel, the jacket of the tire having an annular circumferential fold in each of its edges and engaging the edges of the rim, and detachably secured thereon by a pair of endless rings or hoops separable from the jacket and rim as set forth.

2. In a pneumatic tired wheel, the combination with the rim, of the jacket of the tire having an annular circumferential fold in each of its edges engaging the edges of the rim and extending over the same onto the inner face thereof and detachably secured thereon by a pair of non-extensible rings or hoops located on the outer face of the rim and separable from said rim and jacket as set forth and shown.

3. In a pneumatic tired wheel, the combination with the rim, having a concave outer face, of the jacket of the tire having an annular circumferential fold in each of its edges engaging the edges of the rim and extending over the same onto the inner face thereof, a pair of non-extensible rings or hoops located on the outer face of the rim separable from the jacket and rim, holding the jacket in the aforesaid position, said rings or hoops being of smaller diameter than the edges of the rim to grip the edge portions of the jacket thereat by inflation of the air-tube, and said rings or hoops being of larger diameter than the center of the rim and adapted to be moved toward the center after deflating the air-tube to remove the jacket from the rim as set forth and shown.

In testimony whereof we have hereunto signed our names this 19th day of May, 1894.

LUCIEN BARNES, SR.
CHARLES O. BARNES.

Witnesses:
JOHN J. LAASS,
C. L. BENDIXON.